(12) United States Patent
Quantz

(10) Patent No.: US 6,765,044 B1
(45) Date of Patent: Jul. 20, 2004

(54) STARCH-BASED ADHESIVES WITH IMPROVED GREEN BONDING

(75) Inventor: Francis Patterson Quantz, Spartanburg, SC (US)

(73) Assignee: Diversified Polymers, Inc., Spartanburg, SC (US)

( * ) Notice: Subject to any disclaimer, the term of this patent is extended or adjusted under 35 U.S.C. 154(b) by 145 days.

(21) Appl. No.: 09/850,486

(22) Filed: May 7, 2001

Related U.S. Application Data

(60) Provisional application No. 60/202,499, filed on May 5, 2000.

(51) Int. Cl.[7] .............................. C08L 3/02; C08K 3/22; B32B 29/08
(52) U.S. Cl. ...................... 524/47; 524/211; 524/430; 524/431; 524/432; 428/211; 428/355 CP; 428/355 BL; 428/507
(58) Field of Search ................. 524/47, 479, 430–432, 524/211; 428/211, 343, 355 CP, 355 BL, 507

(56) References Cited

U.S. PATENT DOCUMENTS

| | | |
|---|---|---|
| 3,321,422 A | 5/1967 | Houff et al. |
| 3,480,455 A | 11/1969 | Richardson et al. |
| 3,719,514 A | 3/1973 | Taylor |
| 3,844,807 A | 10/1974 | Bramel |
| 3,960,638 A | 6/1976 | Ogata et al. |
| 3,963,553 A | 6/1976 | Kiritani et al. |
| 3,984,275 A | 10/1976 | Hofmann et al. |
| 4,183,997 A | 1/1980 | Stofko |
| 4,336,166 A | 6/1982 | Penczuk et al. |
| 4,424,291 A | 1/1984 | Leake et al. |
| 4,431,757 A | 2/1984 | Okitsu et al. |
| 4,524,164 A | 6/1985 | Viswanathan et al. |
| 4,568,714 A | 2/1986 | Overholt |
| 4,812,496 A | 3/1989 | Leadbetter et al. |
| 4,972,018 A | 11/1990 | Leadbetter |
| 5,626,945 A * | 5/1997 | Berzins et al. ............. 428/174 |
| 5,635,279 A * | 6/1997 | Ma et al. .................... 428/174 |
| 5,639,333 A | 6/1997 | Krankkala |
| 6,066,379 A * | 5/2000 | Ma et al. ..................... 428/53 |

FOREIGN PATENT DOCUMENTS

| | | |
|---|---|---|
| GB | 1085833 | 10/1967 |
| JP | 53-35757 | 4/1978 |

* cited by examiner

*Primary Examiner*—Peter Szekely
(74) *Attorney, Agent, or Firm*—Alston & Bird LLP

(57) ABSTRACT

Complexing packages suitable for use in alkaline starch-based adhesives are provided. The complexing packages generally include a polymeric vehicle and bivalent metal salt derived from a bivalent metal oxide. The complexing packages impart a host of beneficial properties to alkaline starch-based adhesives, including improved green bonding properties.

42 Claims, 2 Drawing Sheets

STARCH-BASED ADHESIVES WITH IMPROVED GREEN BONDING

CROSS-REFERENCE TO RELATED APPLICATIONS

This application claims the benefit of U.S. Provisional Application Serial No. 60/202,499, filed May 5, 2000, under 35 U.S.C. §119(e).

FIELD OF THE INVENTION

The present invention relates to a complexing package used to enhance the rheology and green bonding properties of adhesive compositions, and which further provides improved water resistance. More particularly, the invention relates to starch-based adhesives whose green bonding and moisture resistance have been improved by the addition of a complexing package that includes a bivalent metal oxide.

BACKGROUND OF THE INVENTION

Corrugated paperboard or liner board is commonly prepared by first forming a corrugated element or medium by passing a cellulosic sheet between corrugating rolls that form a substantially sinusoidal cross-section in the sheet, commonly referred to as the fluted layer. An adhesive is applied to the tips of the thus formed sinusoidal portion, or flutes. A non-corrugated or planar cellulosic liner, commonly referred to as a facing layer, is applied against the adhesive coated flutes of the corrugated elements as the corrugated sheet passes between a corrugating roll and a pressure roll. The resulting paper product having the corrugating medium on one side and the planar liner on another side is called a single-faced element. The single-faced element may be used in applications as a liner or buffer material within a container. More commonly, adhesive is applied to the flute tips of the single-faced element and a second liner sheet is subsequently applied to the adhesive liner in a "double facer" operation. The second liner sheet is exposed to conditions of heat and pressure during its contact with the adhesive. Following application of the adhesive, the bond between the corrugating medium and the facing layer(s) is developed by passing the corrugated structure continuously through an oven at temperatures ranging from about 300° to 400° F., thus establishing a fully cured adhesive bond(s).

The adhesives which have been developed to form corrugated paperboard are generally starch-based adhesives, due to the desirable adhesive properties, low cost and ready availability of starch-based products. The most common starch corrugator adhesives in use today are alkaline in character. The earliest corrugated paperboard adhesive patent, U.S. Pat. No. 2,102, 937, discloses an adhesive composition comprising gelatinized starch, ungelatinized starch, alkali and borax in a water base. This adhesive formulation has formed the basis for the manufacture of essentially all corrugated paperboard to date.

In general, starch corrugating adhesives are produced by gelatinizing a relatively small portion of the starch in water with caustic soda to yield a primary mix of gelatinized carrier, which is then slowly added to a secondary mix of the remaining raw (ungelatinized) starch, borax, and water to produce the full-formulation adhesive. During the corrugating process heat is used to increase the viscosity of the adhesive that has been applied to the tips of the flute tips. The applied heat increases the viscosity of the adhesive by swelling the raw starch, or secondary component, through absorption of water from the carrier starch, or primary component. This swelling of the raw starch imparts the initial, or green, bonding (also referred to as tack) between the fluted layer and the facing layer.

The speed at which an adequate green bond is formed is an important aspect of the adhesive formulation. The green bond secures the fluted layer and the facing layer together prior to and during the full cure developed in the oven. Thus, higher production speeds are possible for starch formulations with higher green bond strength. Throughput increases are particularly important to paperboard manufacturers because corrugation is typically a high speed process. For example, a typical commercial bonding apparatus for continuously joining strips of paper to form corrugated paperboard is designed to operated at speed ranging between 150 and 1000 feet of paperboard per minute. Thus, the speed at which corrugating machines can be run is limited by the rapidity of the viscosity increase in the bond line between the fluted layer and the liner layer(s). Therefore, increases in the green bond strength of starch-based adhesives typically employed in paperboard manufacture are highly beneficial.

Moisture resistance is also considered highly beneficial in many corrugated paperboard applications, particularly resistance to high humidity, liquid water and the like. Conventional alkaline gelatin adhesives generally exhibit poor moisture resistance. Acidic starch formulations have been developed to address this problem; however, acidic starch-based adhesives generally have poor green bond strength due to higher gelation temperatures. Various additives have been proposed to improve the green bond strength of acid starch formulations; however the use of such additives is cost prohibitive. Further, such acidic starch compositions suffer from poor viscosity stability, short shelf life, and excessive formaldehyde odor. Acidic corrugating adhesives also tend to be corrosive. Moisture resistant alkaline starch formulations have likewise been proposed. However, the additives generally employed in such moisture resistant alkaline starch compositions significantly decrease the shelf life of the adhesive formulation. Further, the additives employed are commonly formaldehyde based, giving rise to environmental concerns.

Thus there remains in the art a need for starch-based adhesives having superior green bond strength, improved moisture resistance, and which are further cost effective to produce and have adequate shelf life.

SUMMARY OF THE INVENTION

The present invention provides a complexing package for alkaline starch-based adhesive formulations that imparts superior green bond strength and improved moisture resistance, is cost effective, does not pose the environmental concerns associated with formaldehyde, and possesses adequate shelf-life. The complexing package of the present invention thus permits conventional alkaline starch-based adhesives to be used at higher corrugator speeds while simultaneously providing a more moisture resistant product. It has further been found that inclusion of the complexing package of the present invention leads to starch formulations having more uniformly distributed starch particles that are generally more closely spaced, as well as providing a more consistent viscosity to the resulting adhesive. It is further believed that the complexing package of the present invention may find utility in a wide range of compositions in which such rheological modification would be beneficial, in addition to alkaline starch-based adhesives.

The present invention provides complexing packages that include at least one bivalent metal salt derived from a bivalent metal oxide and at least one polymeric vehicle, the polymeric vehicle capable of transporting the bivalent metal salt into the starch formulation. Exemplary bivalent metal oxides include zinc oxide, calcium oxide, magnesium oxide, lead oxide, copper oxide, aluminum oxide, iron oxide, titanium oxide, and mixtures thereof. In advantageous embodiments, the bivalent metal oxide is zinc oxide. Exemplary effective amounts of the bivalent metal oxide range from about 2 to about 4 wt % based on the weight of the complexing package ("boc"). Exemplary polymeric vehicles include alkali stable carboxylated polymers and polyvinyl alcohol. Advantageously, the polymeric vehicle comprises a carboxylated styrene-butadiene polymer. The polymeric vehicle may be present in the complexing package in effective amounts ranging from about 12 to about 20 wt % boc.

In further advantageous embodiments, starch-based adhesives are provided which include the complexing package of the present invention. The complexing package can be included in the starch-based adhesive in amounts ranging from about 1.3 to about 1.7 wt %, based on the weight of the adhesive. Adhesives incorporating the complexing package of the present invention have improved green bonding properties, believed to stem from improved theological properties. The improved rheological properties imparted by the complexing package of the present invention is further believed to translate into other highly beneficial properties, such as increased consistency in the viscosity of the adhesive. The invention further relates to corrugated paperboard incorporating the complexing package and starch-based adhesives of the present invention.

DESCRIPTION OF THE PREFERRED EMBODIMENTS

Figure 1:
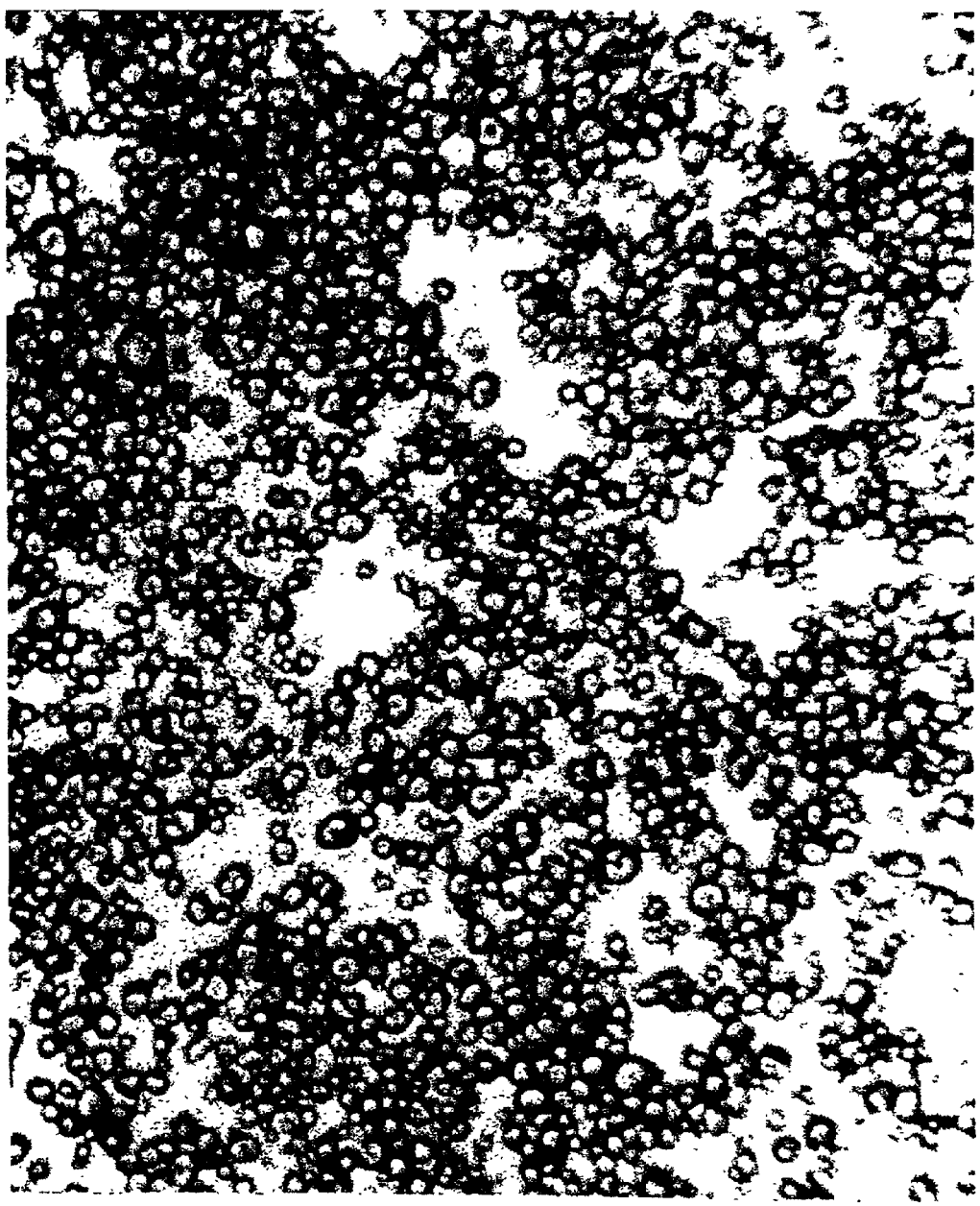
FIG. 1 is a photograph of a conventional starch-based adhesive dispersion.

The present invention will now be described more fully hereinafter with reference to preferred embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art.

Although the complexing package of the present invention is believed to be useful in a variety of dispersions in which a greater density of suspended solids is beneficial, including a variety of adhesive formulations, it is particularly useful in starch-based adhesives, such as used in the manufacture of corrugated paperboard. Thus, for purposes of clarity and illustration only, the dispersions are described herein mainly in terms of an alkaline starch-based corrugator adhesives.

The complexing package of the present invention generally comprises a buffered alkaline solution that includes at least one bivalent metal oxide and at least one polymeric vehicle. Advantageous alkaline starch-based adhesives incorporating the complexing package of the present invention generally comprise: (a) water; (b) a starch binder composition; and (c) the complexing package of the present invention.

The complexing package includes at least one bivalent metal oxide present within the composition in the form of a bivalent metal salt mixture. As will be discussed in greater detail below, it is believed that the presence of the bivalent metal in the complexing package leads to a shift in the resulting colloidal properties of the starch dispersion, bringing the starch particles closer together within the suspension, thus improving numerous Theological and adhesive properties. Any bivalent metal oxide that is soluble in an alkaline solution and capable of complexing with starches is believed to be suitable for use within the complexing package. As defined herein, the term "metal oxide" also includes metal hydroxides. Exemplary metal oxides include oxides of zinc, calcium, magnesium, lead, copper, aluminum, iron, titanium, and the like. In one particularly advantageous embodiment, zinc oxide is employed. Zinc oxide is particularly well suited in the present invention as it is readily soluble under highly alkaline conditions, such as a pH of about 11.5. Zinc oxide may be procured from a variety of sources, including Zochem. The metal oxide is generally present in the complexing package in exemplary amounts ranging from about 2 to about 4 wt % based on the weight of the complexing package ("boc").

The complexing package further comprises a polymeric vehicle, typically dispersed in the form of a latex. Although not wishing to be bound by theory, it is believed that the bivalent metal salts attach to, or piggyback on, the polymeric vehicle. The bivalent metal salts are thus transported throughout the starch solution, rather than precipitating out at the pHs typically employed in alkaline starch-based adhesives. Any polymer capable of forming an alkali stable latex having a suitable pH tolerance and capable of associating with the bivalent metal salt may be employed as a polymeric vehicle in the present invention, especially carboxylated polymers.

In particularly advantageous embodiments, carboxylated styrene-butadiene polymer is used as the polymeric vehicle in the complexing package. Carboxylated styrene-butadiene is particularly attractive for use due to its stability under highly alkaline conditions, e.g. a pH greater than 10. Carboxylated styrene-butadiene polymers are typically provided as aqueous latexes. Carboxylated styrene-butadiene latexes are well known to those skilled in the art and comprise an aqueous dispersion of a copolymer formed by the emulsion copolymerization of styrene and butadiene together with a small amount of an alpha, beta-ethylenically unsaturated $C_3$ to $C_6$ mono-or dicarboxylic acid or amide thereof such as acrylic or methacrylic acid or acrylamide or methacrylamide. Such carboxylated styrene-butadiene latexes generally comprise a solids content of about 50% by weight. Any of a wide variety of conventional carboxylated styrene-butadiene copolymer latexes can be used in the present invention. In one particularly advantageous embodiment, SB-1177 Emulsion from B.F. Goodrich Corporation is employed. In alternative embodiments, latexes having improved water resistance, such as the isopropenyl oxazoline-modified styrene-butadiene latexes described in U.S. Pat. No. 4,972,018, may be advantageously employed. In an alternative embodiment, polyvinyl alcohol may be used as the polymeric vehicle. The polymeric vehicle may be present in the complexing package in exemplary amounts ranging from about 12 to about 20 wt % boc.

An alkali or basic material is also included in the complexing package, such as ammonium hydroxide or the like. Exemplary amounts of the alkali or basic material within the complexing package range from about 3 to about 5 wt % boc. The complexing package further includes an alkaline buffer. In one particularly advantageous embodiment, the alkaline buffer is ammonium carbonate. The alkaline buffer is generally present in the complexing package in amounts ranging from about 2 to about 5 wt % boc.

In addition to an alkaline buffer, the complexing package further includes an acidic buffer. The acidic buffer is generally a mild acid, preferably a mild carboxylated acid. In one advantageous embodiment, citric acid is employed as the acidic buffer. The mild acid can be present in the complexing package in exemplary amounts ranging from about 2.5 to about 3.5 wt % boc.

Various additives may also be included in the complexing package. In beneficial embodiments, urea is included in the complexing package as an additive. In advantageous aspects of these embodiments, urea is present in the complexing package in an exemplary amount of about 10 wt % boc.

The complexing package of the present invention is prepared by initially forming a bivalent metal salt solution. The bivalent metal salt solution is added to a dispersion containing the polymeric vehicle, the pH of the composition is then adjusted, and various additives may subsequently be incorporated to complete the complexing package.

To form the bivalent metal salt solution, the bivalent metal oxide is dissolved or dispersed in an alkaline solution. The solubility of the bivalent metal oxide is typically directly proportional to the alkalinity of the solvent. Thus, the bivalent metal salt solution is prepared by dissolving a bivalent metal oxide in a highly alkaline solution, such as water at a pH ranging from about 10 to about 12. Accordingly, an alkaline solution comprising about 3 to about 5 wt % based on the weight of the complexing package ("boc") ammonium hydroxide in water is initially prepared. An effective amount of a bivalent metal oxide is then added to the alkaline solution to form a bivalent metal salt slurry. The bivalent metal oxide may be added to the alkaline solution in exemplary effective amounts ranging from about 12 to about 16 wt % based on the weight of the alkaline solution, preferably about 15 wt % based on the weight of the alkaline solution. To further solubilize the bivalent metal oxide, an alkaline buffer is also incorporated into the alkaline solution, particularly ammonium carbonate. The alkaline buffer may be added to the alkaline solution in exemplary amounts ranging from about 2 to about 5 wt % boc. The alkaline buffer may be added to the alkaline solution either before or after the bivalent metal oxide has been added to the alkaline solution, preferably after. In advantageous embodiments, an effective amount of zinc oxide is added to an aqueous ammonium hydroxide solution further containing an effective amount of ammonium carbonate, thus forming a zinc salt solution. Zinc oxide is particularly advantageous in the present invention because it readily dissociates to form a uniform solution under highly alkaline conditions, such as aqueous solutions having a pH of about 11.5. In beneficial aspects, an alkaline solution containing dissolved zinc oxide ranging in amounts of from about 12 to about 16 wt % based on the weight of the alkaline solution, preferably about 15 wt % based on the weight of the alkaline solution, is prepared. In an alternative embodiment, a commercially available zinc oxide solution may be employed.

The bivalent metal salt solution is added to a dispersion or latex containing the polymeric vehicle. In advantageous embodiments, the bivalent metal salt solution is added to a sufficient amount of the dispersion to ensure that the polymeric vehicle is present within the complexing package in amounts ranging from about 12 to about 20 wt % boc, preferably about 15 wt % boc. Advantageously, a bivalent metal salt solution derived from zinc oxide is added to a carboxylated styrene-butadiene latex. The pH of the dispersion immediately following the addition of the bivalent metal salt solution is about 10 to about 10.5.

Subsequent to the addition of the bivalent metal salt solution to the dispersion or latex containing the polymeric vehicle, an acidic solution is added to the composition to provide stability to the colloidal suspension by lowering the pH. More specifically, an acidic solution is added in an amount sufficient to incorporate about 2.5 to about 3.5 wt % boc of a mild acid buffer into the complexing package. In advantageous embodiments, a carboxylated acid, such as citric acid is added to the dispersion. In one particularly advantageous aspect of the present invention, an aqueous solution of citric acid is added to the dispersion in an amount sufficient to provide about 3.0 wt % boc citric acid to the complexing package. The complexing package typically has a pH ranging from about 9.0 to about 10 following the addition of the acidic solution.

It is hypothesized that at lower alkaline pHs, e.g. pHs ranging from about 9.0 to about 10, many bivalent metal salts, such as the salts formed by zinc oxide, are not as soluble as they are at higher pHs. Although not wishing to be bound by theory, it is believed that the bivalent metal salts remain suspended in the complexing package of the present invention due to their interaction with the polymeric vehicle. Applicant has found that the use of a polymeric vehicle having a wide pH tolerance allows the polymeric vehicle to compensate for disadvantages normally encountered with the use of bivalent metal salts. For example, the polymeric vehicles of the present invention may be initially combined with the bivalent metal salts under conditions in which the bivalent salts are highly soluble and uniformly dispersed, e.g. highly alkaline conditions. Once interaction has been initiated between the polymeric vehicle and the bivalent metal salts, the pH may then be lowered safely, without precipitating or agglomerating the bivalent metal salts out of solution. Thus, the polymeric vehicle provides stability to the bivalent metal salt at lower pHs, for example pHs of less than about 11.5. Carboxylated styrene butadiene polymers are thus particularly advantageous for use as the polymeric vehicle in the complexing package of the present invention because they are stable over a wide range of pHs. Further, carboxylated styrene butadiene polymers can be more flexible than many other polymers, such as some acrylate-containing polymers. This improved flexibility, imparted by the presence of the butadiene component within the polymer, can be highly beneficial. For example, the use of more flexible polymers would be expected to allow corrugating adhesives containing the complexing package of the present invention to bend with the corrugated paperboard when it is subjected to stresses in the field, rather than crack.

Following or concurrent with the addition of the acidic solution to the complexing package, other additives may be incorporated into the composition. In one beneficial embodiment, urea is incorporated into the composition following the addition of the acidic solution, to complete the complexing package. For example, about 10 wt % boc urea may be added to the complexing package. The urea serves as a weighter (i.e. increases the solids), acts as a masking agent, and aids in penetration.

Accordingly, in advantageous embodiments the complexing package generally comprises an alkaline aqueous mixture of a styrene-butadiene carboxylated polymer dispersion and an equilibrium mixture of a zinc oxide that has dissociated to form a zinc amine complex salt, zinc hydroxide salt, zinc carboxylate complex, zinc urea complex, ammonium carbonate, ammonium citrate, and possibly a trace amount of zinc oxide.

As noted previously, the complexing package of the present invention may be beneficially incorporated into a variety of adhesive formulations, particularly conventional starch-based adhesives, especially alkaline starch-based adhesives. The pH of such alkaline starch-based adhesives typically ranges from about 10 to 11.

Eye The alkaline starch-based adhesives into which the complexing package is incorporated may be formed from a mixture of primary and secondary starch components, as is known in the art. The starch used in both the primary and secondary components (also referred to as "mixes" or "mixtures") is a commodity chemical produced from a number of root, stem or fruit plant sources. In general, starch is a high molecular weight polymeric carbohydrate polysaccharide, most commonly composed of six carbon monosaccharide units joined by alpha-glycan linkages having an approximate molecular formula of $(C_6H_{10}O_5)n$, wherein n equals $10^2$ to $10^6$. Starch occurs naturally in the form of white granules and comprises linear and branched polysaccharide polymers.

The starch component, which serves as a binder for the adhesive, can be comprised of one or more of any of the numerous starches and modified starches heretofore used in starch-based adhesives including such illustrative materials as wheat starch, tapioca, potato starch and pearl starch. Preferred starches are those typically used in alkaline corrugator adhesives. Pearl starch is one preferred type of starch. The total starch content of the adhesive can vary considerably depending upon numerous factors such as the intended application of the adhesive and the type of starch used. Illustratively, the starch forms about 20 to 30 wt % based on the adhesive composition ("boa"), and preferably about 26 to 28% by weight of the adhesive composition.

In an alternative embodiment, protein is employed as the binder component rather than, or in addition to, the starch. For the purposes of illustration only, the remainder of the specification will refer to starch-based adhesives, however.

The starch-based adhesive compositions of the present invention further include a boron based compound which cooperates with the starch provided by the primary and secondary mixes. More particularly, the boron-based compound reacts with available hydroxyl groups of the starch, thus forming a complex which aids in gelling the starch molecules, as is known in the art. This cooperative reaction increases the tack of the adhesive and produces strong bonds. Borax (sodium tetraborate decahydrate, $Na_2B_4O_7 \cdot XH_2O$ and other hydrate and anhydrous forms) is commonly used as the boron-based compound. In one particularly advantageous aspect, borax with 5 moles of hydration is employed. In an alternative embodiment, a boric acid can be used, particularly commercial boric acid (orthoboric acid, $H_3BO_3$ and its hydrated forms $H_3BO_3 \cdot XH_2O$). The boron based compound may be included in the starch-based adhesive composition in conventional amounts, as known in the art.

Conventional alkaline starch-based adhesive additives may also be incorporated into the adhesive compositions of the present invention to obtain specific results. Exemplary additives include weighters; masking agents; preservatives; wetting agents; plasticizers; solubilizing agents; additional rheology modifiers; water conditioners; penetration control agents; peptizers; gelatinization temperature modifiers; inert fillers such as clay and finely ground polymers; thickeners such as inorganic colloidal clays, hydroxyethyl cellulose, polyvinyl alcohol, polymers of ethylene oxide and the like; and emulsions such as polyvinyl acetate.

The starch compositions (also referred to as "starch binder compositions" or "starch dispersions") suitable for use with the complexing package of the present invention are prepared in accordance with normal procedures known to those skilled in the art for preparing conventional alkaline starch-based adhesives. Typically, starch-based adhesives are comprised of a starch dispersion formed by combining a primary mix of gelled starch, also referred to as a carrier starch, with a secondary mix of raw, or ungelled, starch that further contains a boron-based compound.

The primary mix of gelled carrier starch is prepared by adding a minor portion of the total starch content of the adhesive, e.g., 10 to 20% of the total starch employed, to hot water at temperatures of about 120°–140° F. A small amount of starch gelling agent such as caustic (NaOH) is then added to the mixture to cause gelation of the starch in the primary mix. Illustratively, about 17 to 19% by weight of dry gelling agent, and preferably about 17.5%, are used per part of starch present in the primary mix.

The secondary mix is prepared by adding the remainder of the starch to hot water at temperature of about 90° F. A boron-based compound is then added to complete the secondary starch mix. In advantageous embodiments, 0.4 to 0.5 wt. % boa, of borax having 5 moles of hydration is added to the secondary mix. A trace amount of bactericide is then added, as is known in the art. In general, to prepare the full formulation adhesive, the primary mix is slowly added to the secondary mix, as is well known in the art. An alkali or basic material may also be added to the starch binder composition, to provide a pH of greater than about 10. Any suitable alkali or basic material may be employed in the starch binder composition, including ammonium hydroxide, sodium hydroxide, potassium hydroxide, and the like.

The complexing package may be incorporated into the starch-based adhesive formulation either following or simultaneous with the addition of the primary mix to the secondary mix. In one preferred aspect, the complexing package and the primary mix are added to the secondary mix simultaneously to form the starch-based adhesive. In an alternative embodiment, the complexing package is incorporated into the secondary mix prior to the addition of the primary mix. The complexing package is added to the starch-based adhesive formulation in exemplary amounts ranging from about 1.3 to about 1.7 wt. % boa, preferably about 1.5 wt. % boa.

The Stein-Hall cup viscosities of exemplary starch-based adhesives containing the complexing package are illustratively about 50 to 90 seconds, following brief agitation. The complexing package of the present invention is highly beneficial in that it allows the starch dispersion to maintain continuous flow properties over a wider range of temperatures. In particular, starch dispersions of the present invention retain smoothness over a wider range of temperatures in comparison to conventional starches. Thus, the starch dispersions of the present invention have a reduced tendency to set-back. Gel temperatures of the alkaline starch-based adhesives of the present invention are illustratively about 140° to about 146° F. The solids are uniformly dispersed throughout the present adhesive and the flow properties of the adhesive of the invention are highly suitable for use in a corrugator.

Figure 2:
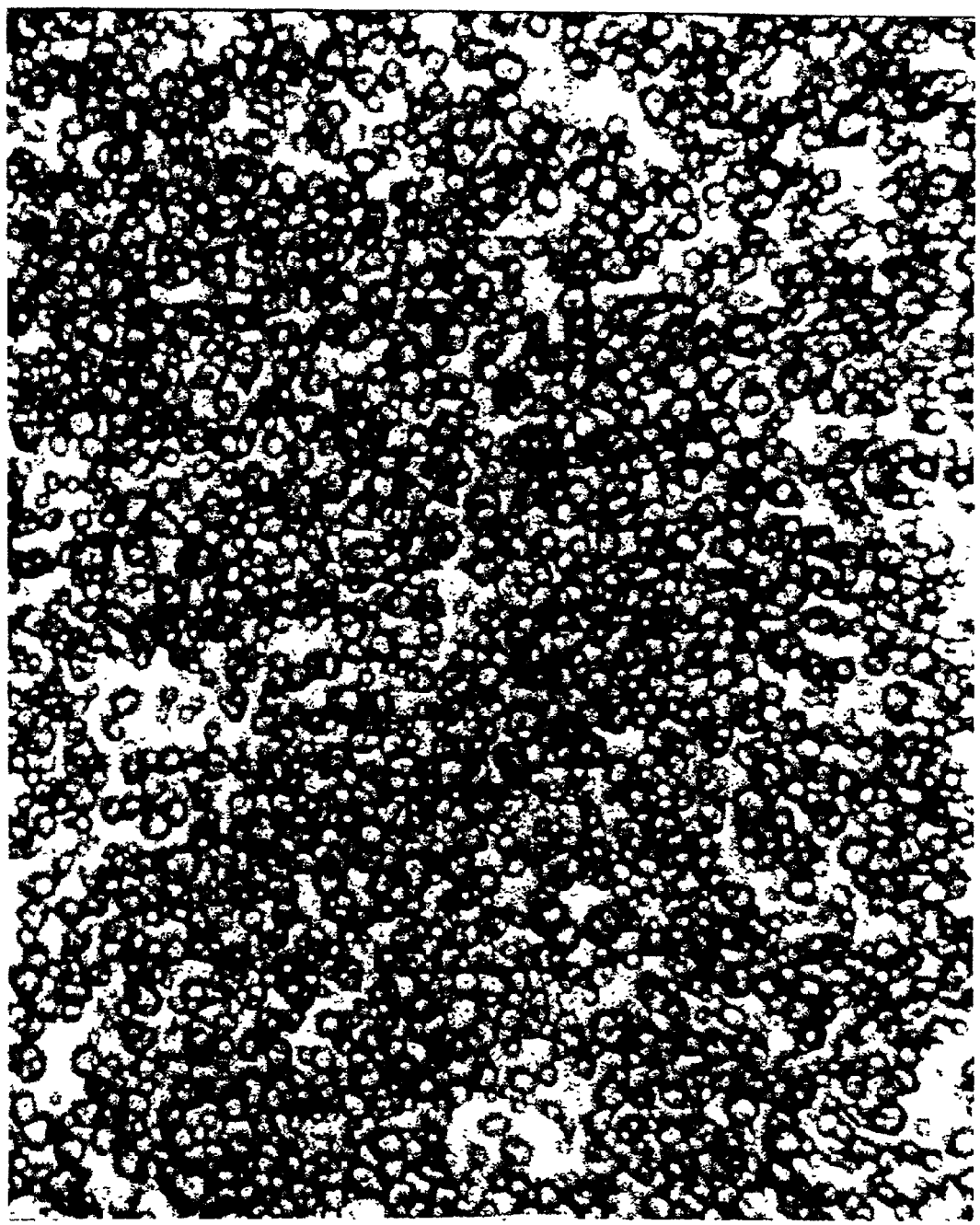
FIG. 2 is a photograph of a conventional starch-based adhesive dispersion comparable to that of FIG. 1 which further comprises the complexing package of the present invention.

The complexing package of the present invention provides improved green bonding to the resulting adhesive formulation. Although not wishing to be bound by theory, it is believed that the improved green bonding is actually due to various rheological benefits that the complexing package imparts to the starch-based adhesive. The shift in theological behavior induced by the complexing package is indicated by a comparison of FIGS. 1 and 2. A conventional starch dispersion is illustrated in FIG. 1. As shown, the starch particles within a conventional starch dispersion form a nonuniform distribution of agglomerates. FIG. 2 illustrates a comparable starch dispersion further comprising the complexing package of the present invention. As shown, the distribution of the starch agglomerates within the dispersion of the present invention is improved, and the starch agglomerates appear to be generally closer. It is believed that this shift in rheology results in the presence of more starch particulates within a given volume of adhesive, thus improving the green bond characteristics during processing. The increase in green bonding provided by the complexing package leads to typical increases in corrugator line speed ranging from 20 to 30% for alkaline starch-based adhesives.

In conventional starch dispersions, an electrical double layer surrounding each starch particle tends to repel neighboring starch particles. Thus, in conventional starch dispersions the starch particles are separated by large and irregular spaces and the starch particles do not move past each other freely. In contrast, starch dispersions including the complexing package of the present invention have a closer, more regular spacing. This more regular spacing is believed to provide a highly consistent viscosity to starch dispersions utilizing the complexing package of the present invention. In addition, the viscosity of starch dispersions incorporating the complexing package of the present invention remains more consistent over time than conventional starch dispersions made without the present complexing package. It is believed that this consistency is due to the collapse the electrical double layer surrounding each starch particle in the dispersion, thus allowing the starch particles to approach each other more closely and move more freely around each other.

In addition to rheological benefits, the present invention provides increased moisture resistance, as well. In particular, it is hypothesized that the bivalent metal ions within the complexing package provide improved moisture resistance in the dried adhesive by complexing to form salts with negatively charged carboxylic acid groups, such as the carboxylic acid groups present in the polymeric vehicle and any carboxylated groups present on the buffering acid, e.g. those embodiments employing carboxylated styrene butadiene and/or a citric acid buffer. Further, it is proposed that the bivalent metal salt complexes with the electron rich oxygen bearing groups on the starch. The combination of these salts and complexes form a three-dimensional cross-linked matrix as the starch film dries. Therefore, it is expected that films formed from the starch-based adhesives of the present invention will have improved moisture resistance. It is also believed that adhesives incorporating the complexing package of the present invention may harden and become adhesive more readily and at lower temperatures than those of conventional systems.

The adhesive of the present invention can be used to bond single- or double-faced corrugated paperboard using any equipment which is presently employed for the preparation of corrugated paperboard. The present adhesive may be applied to the flute tips of corrugated paperboard in conventional amounts, as known in the art. In advantageous aspects, the adhesive is maintained at a temperature of preferably about 100° F. before its application to the fluted tips. The actual application may be accomplished by the use of glue rolls which are ordinarily employed in most corrugating machines, or one may, if desired, utilize other application methods which may be able to achieve a more economical distribution of adhesive. Following the application of the adhesive to the fluted paper strip, the latter is brought into immediate contact with the facing layer under the influence of heat and pressure, as is well known in the art. A double-faced board may be subsequently prepared by bringing a second facing layer in contact with the open fluted surface of the single-faced board by the usual procedures.

In addition to its use as in corrugator adhesives, the complexing package of the present invention is beneficial in any general purpose adhesive useful whenever a good green bond and a flexible permanent bond, whether water-resistant or otherwise, is desired. The complexing package may also be of benefit in other latices or dispersions in which greater uniformity and closer spacing of suspended particulates is desirablle.

The following non-limiting Example serves to further illustrate the present invention.

EXAMPLE a. Preparation of the Complexing Package i. The Zinc Salt Solution ("zss")

A 15 wt % (based on zss) zinc salt solution was prepared. About 25 parts ammonium hydroxide was initially added to about 45 parts water to form an alkaline solution. Approximately 15 parts zinc oxide was added to the alkaline solution. To complete the zinc salt solution, about 15 parts ammonium carbonate was added to the alkaline solution following the addition of the zinc oxide. The pH of the dispersed zinc salt solution was about 11.7.

ii. Combining the Complexing Package 30 parts of a 50% solids carboxylated styrene-butadiene dispersion, SB-1177 Emulsion from B.F. Goodrich Corporation, was placed into a vessel. Approximately 20 parts of the zinc salt solution prepared in accordance with (i) above was added to the carboxylated styrene-butadiene dispersion. An acidic solution comprised of approximately 3.0 parts of citric acid in 37 parts water was then added to the composition. Lastly 10 parts of urea was added to complete the complexing package. Thus the composition of the complexing package comprised (based on the weight of the complexing package): about 3% zinc oxide; about 5% ammonium hydroxide; about 40% carboxylated styrene-butadiene dispersion; about 3.5% citric acid; about 10% urea and about 38.5% water. The final pH of the complexing package was about 9.5.

b. Preparation of a Starch-based Adhesive of the Present Invention i. The Primary Starch Component A primary starch solution was prepared by adding 3.43 parts ungelantinized wheat starch, based on weight of the total starch composition ("bos") to 14.3 parts water bos at a temperature of about 140° F. Approximately 0.60 parts caustic soda bos was added to the primary starch solution. The primary starch solution was agitated for 10 minutes. Following mixing, 14.3 parts cooling water bos was added.

ii. The Secondary Starch Component

A secondary starch solution was prepared by adding 24 parts ungelatinized starch bos to 42.9 parts water bos, that was subsequently heated to a temperature of 90° F. Approximately 0.446 parts borax (with 5 moles of hydration) was then added to the secondary starch solution, followed by a trace of bactericide.

iii. The Full Formulation Adhesive

The primary starch component and the complexing package were added simultaneously into the secondary starch component over a 20 minute period, under agitation. The combined starch components were then mixed for an additional 10 minutes, thus providing the full formulation adhesive. The complexing package was added in an amount sufficient to form approximately 1.5 wt. % of the full formulation starch-based adhesive.

The alkaline starch-based adhesives of the present invention provide a host of beneficial properties, including improved green bonding properties and improved moisture resistance. The adhesives of the present invention further provide improved viscosity control. Further benefits include gel point stabilization. The complexing package also has adequate storage stability or shelf-life. For example, shelf lives of up to a year are possible with the complexing package of the present invention. The starch dispersions are much more uniform and free from gel particles when employing the complexing package of the present invention. The film bond strength is improved in the present invention. The equipment used to form corrugated paperboard can be run at a higher speed, thus providing a more economical final product. Waste is reduced. Edge bond is improved. As noted above, the rheology of the starch solutions is more controlled in the dispensing machines. The use of expensive acid modified starch is avoided. The present invention allows a very economical crude, e.g. alkaline, starch to be employed in both the primary and secondary starch mixes. Further, the present invention provides a host of improved properties without the use of formaldehyde.

That which is claims is:

1. An alkaline starch-based corrugating adhesive formulation comprising:
   a starch binder composition;
   a sufficient amount of an alkaline material to provide the adhesive with a pH ranging from about 10 to about 11; and
   a complexing package,
   wherein said complexing package comprises a carboxylated styrene-butadiene latex and at least one bivalent metal salt derived from at least one bivalent metal oxide, said carboxylated styrene-butadiene latex capable of transporting said bivalent metal salt into said starch binder composition.

2. An adhesive formulation according to claim 1, wherein said bivalent metal oxide is selected from the group consisting of zinc oxide, calcium oxide, magnesium oxide, lead oxide, copper oxide, aluminum oxide, iron oxide, titanium oxide, and mixtures thereof.

3. An adhesive formulation according to claim 1, wherein said bivalent metal oxide is zinc oxide.

4. An alkaline adhesive formulation according to claim 1, wherein said bivalent metal oxide is present in said complexing package in an amount ranging from about 2 to about 4 wt % boc.

5. An adhesive formulation according to claim 1, wherein said carboxylated styrene-butadiene latex is present in said complexing package in an amount ranging from about 12 to about 20 wt % boc.

6. An adhesive formulation according to claim 1, wherein said complexing package is present in said starch-based adhesive formulation in an amount ranging from about 1.3 to about 1.7 wt % boa.

7. An adhesive formulation according to claim 1, wherein said complexing package further comprises urea.

8. An adhesive formulation according to claim 1, wherein said complexing package further comprises an alkaline material.

9. An adhesive formulation according to claim 8, wherein said alkaline material is ammonium hydroxide.

10. An adhesive formulation according to claim 1, wherein said complexing package further comprises an alkaline buffer.

11. An adhesive formulation according to claim 10, wherein said alkaline buffer is ammonium carbonate.

12. An adhesive formulation according to claim 1, wherein said complexing package further comprises a carboxylated acid.

13. An adhesive formulation according to claim 12, wherein said carboxylated acid is citric acid.

14. An adhesive formulation according to claim 1, wherein said starch binder composition is derived from a starch selected from the group consisting of wheat starch, tapioca, potato starch, pearl starch, and mixtures thereof.

15. An adhesive formulation according to claim 14, wherein said starch binder composition is derived from pearl starch.

16. An adhesive formulation according to claim 1, wherein said starch binder composition further comprises a primary starch mixture and a secondary starch mixture.

17. An adhesive formulation according to claim 16, wherein said primary starch mixture further comprises a starch gelling agent.

18. An adhesive formulation according to claim 16, wherein said secondary starch mixture further comprises a boron-based compound.

19. An adhesive formulation according to claim 18, wherein said boron-based compound is borax.

20. An adhesive formulation according to claim 1, wherein said starch binder composition is present in said adhesive in an amount ranging from about 20 to about 30 wt % boa.

21. An adhesive formulation according to claim 1, wherein said starch binder composition further comprises at least one additive selected from the group consisting of weighters, masking agents, preservatives, wetting agents, plasticizers, solubilizing agents, rheology modifiers, water conditioners, penetration control agents, peptizers, gelatinization temperature modifiers, inert fillers, thickeners, emulsions, and mixtures thereof.

22. An adhesive formulation according to claim 1, wherein:
   (a) said starch binder composition is derived from pearl starch;
   (b) said alkaline material is ammonium hydroxide;
   (c) said bivalent metal oxide is zinc oxide.

23. An alkaline starch-based corrugating adhesive formulation comprising:
   (a) a starch binder composition;
   (b) a sufficient amount of an alkaline material to provide the adhesive with a pH ranging from about 10 to about 11; and
   (c) a complexing package,
   wherein said complexing package comprises polyvinyl alcohol and at least one bivalent metal salt derived from at least one bivalent metal oxide, said polyvinyl alcohol capable of transporting said bivalent metal salt into said starch binder composition.

24. An adhesive formulation according to claim 23, wherein:
   (a) said starch binder composition is derived from pearl starch;
   (b) said alkaline material is ammonium hydroxide;
   (c) said bivalent metal oxide is zinc oxide.

25. A method for preparing alkaline starch-based corrugating adhesives, comprising the steps of:
(a) preparing a primary starch mixture;
(b) preparing a secondary starch mixture;
(c) preparing a complexing package comprising at least one bivalent metal salt derived from a metal oxide and at least one polymeric vehicle;
(d) combining the primary and secondary starch mixtures; and
(e) incorporating the complexing package into a mixture of the primary starch mixture and secondary starch mixture.

26. A method according to claim 25, wherein the metal oxide is zinc oxide.

27. A method according to claim 25, wherein the polymeric vehicle is a carboxylated styrene-butadiene latex.

28. A method according to claim 25, wherein said step of preparing a complexing package further comprises:
(a) dispersing the metal oxide in an alkaline solution;
(b) combining the solution formed in step (a) with the polymeric vehicle; and
(c) buffering the solution formed in step (b) to a pH ranging between about 9 and about 10.

29. A method according to claim 28, wherein said buffering is performed using citric acid.

30. A method according to claim 28, wherein said step of preparing a complexing package further comprises the step of adding urea.

31. A method according to claim 25, wherein step (e) further comprises incorporating the complexing package, the primary starch mixture and the secondary starch mixture simultaneously.

32. Corrugated paperboard incorporating the alkaline starch-based adhesives of claim 1.

33. A complexing package for improving green strength of an adhesive applied to the flute tips of the a layer of corrugated paperboard comprising:
at least one bivalent metal oxide;
an ammonium salt in an amount sufficient to solubilize said bivalent metal oxide;
a carboxylated polymer in an amount sufficient to provide stability to said solubilized bivalent metal salt at pHs below 11.5;
an acid in an amount sufficient to buffer said complexing package; and
the remainder being water.

34. The complexing package according to claim 33, wherein said bivalent metal oxide is selected from the group consisting of zinc oxide, calcium oxide, magnesium oxide, lead oxide, copper oxide, aluminum oxide, iron oxide, titanium oxide, and mixtures thereof.

35. The complexing package according to claim 33, wherein said bivalent metal oxide is zinc oxide.

36. The complexing package according to claim 33, wherein said bivalent metal oxide is present in an amount ranging from about 2 to about 4 wt % boc.

37. The complexing package according to claim 33, wherein said carboxylated styrene-butadiene latex is present in said complexing package in an amount ranging from about 12 to about 20 wt % boc.

38. A complexing package comprising:
at least one bivalent metal salt derived from a bivalent metal oxide;
a carboxylated styrene-butadiene latex, said carboxylated styrene-butadiene latex providing stability to said metal salt at pHs below about 11.5 and further capable of transporting said bivalent metal salt into an alkaline adhesive formulation; and
urea.

39. The complexing package according to claim 33 wherein said acid is present in an amount sufficient to buffer said complexing package to a pH from about 9.0 to 10.5.

40. The complexing package according to claim 33 comprising:
2–4 wt % boc bivalent metal oxide;
2–5 wt % boc;
12–20 wt % boc;
and the remainder being water.

41. A complexing package for improving green strength of starch binder compositions comprising:
a bivalent metal salt derived from a bivalent metal oxide selected from the group consisting of zinc oxide, calcium oxide, magnesium oxide, lead oxide, copper oxide, aluminum oxide, iron oxide, titanium oxide, and mixtures thereof;
ammonium hydroxide in an amount sufficient to solubilize said bivalent metal oxide;
a carboxylated styrene-butadiene latex in an amount sufficient to provide stability to said solubilized bivalent metal salt at pHs below 11.5;
citric acid in an amount sufficient to buffer said complexing package; and
the remainder being water.

42. The complexing package according to claim 41 wherein said acid is present in an amount sufficient to buffer said complexing package to a pH from about 9.0 to 10.5.

* * * * *